Sept. 22, 1931.   A. KHEZARJIAN   1,824,552
VEHICLE BRAKE
Filed Nov. 18, 1929
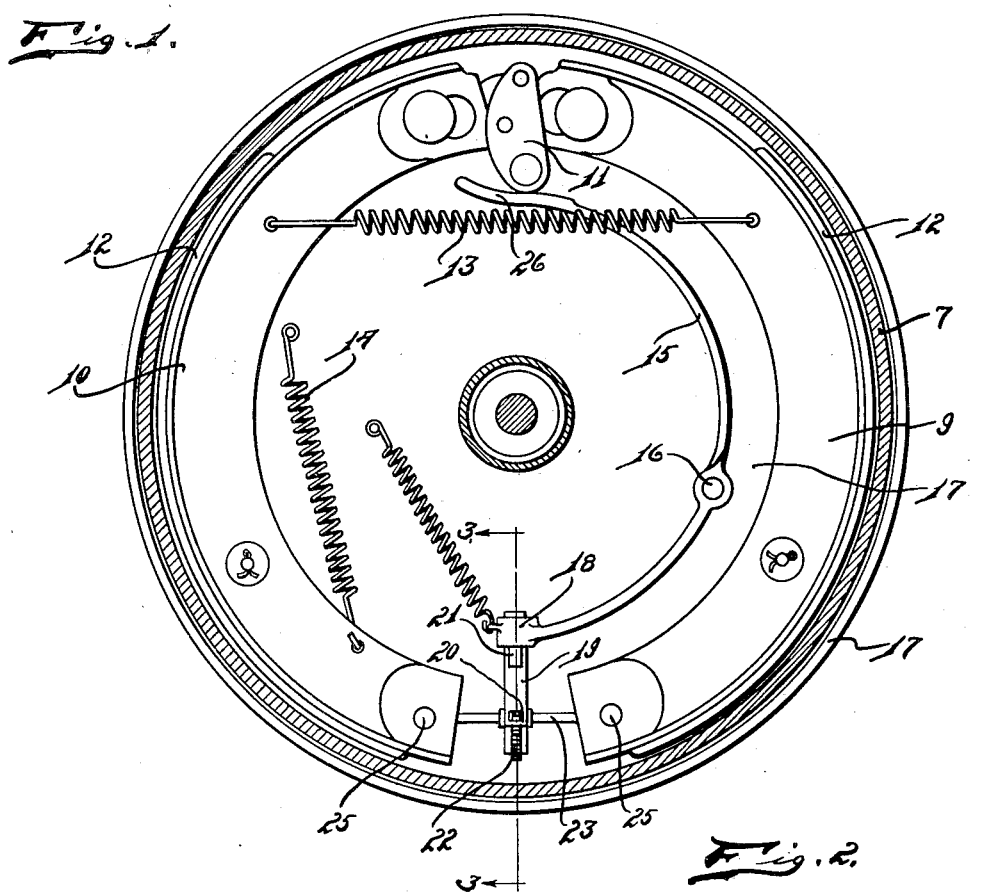
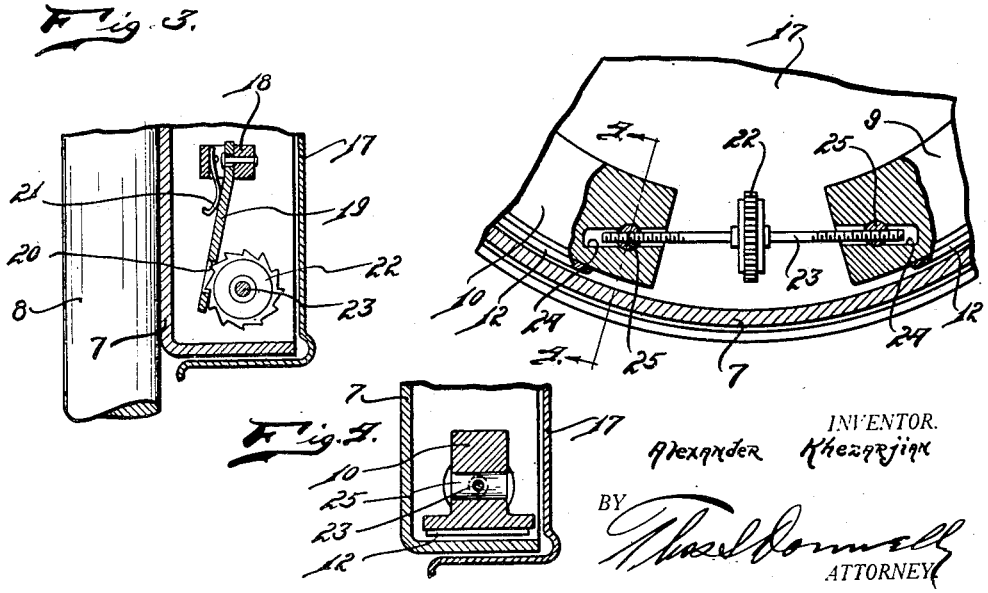
INVENTOR.
Alexander Khezarjian
BY
ATTORNEY Patented Sept. 22, 1931

1,824,552

UNITED STATES PATENT OFFICE

ALEXANDER KHEZARJIAN, OF DETROIT, MICHIGAN

VEHICLE BRAKE

Application filed November 18, 1929. Serial No. 407,855.

My invention relates to a new and useful improvement in a vehicle brake and has for its object the provision of a brake which will automatically adjust itself to compensate for the wear on the brake lining.

Another object of the invention is the provision in a brake of this class of threaded means for moving the brake shoes outwardly relatively to the brake drum and of means for rotating the threaded member upon movement of the brake applying mechanism a predetermined distance.

Another object of the invention is the provision of brake adjusting mechanism of this class which will be simple in structure, economical of manufacture, and highly efficient in use.

Other objects will appear hereinafter.

The invention consists in the combination and arrangement of parts hereinafter described and claimed.

The invention will be best understood by a reference to the accompanying drawings which form a part of this specification, and in which Fig. 1 is a sectional view through a brake showing the invention applied.

Fig. 2 is a fragmentary view of a brake with parts broken away and parts of the invention shown in side elevation.

Fig. 3 is a fragmentary sectional view taken on line 3—3 of Fig. 1.

Fig. 4 is a fragmentary sectional view taken on line 4—4 of Fig. 2.

In the drawings I have shown the invention used with a brake drum 7 which is mounted upon and rotatable with the wheel 8. Brake shoes 9 and 10 are connected together and operable by the brake actuating mechanism or plate 11 to spread apart and bring the brake shoe lining 12 into engagement with the inner surface of the brake drum 7. Springs 13 and 14 are attached to the shoes 9 and 10 in a well known manner for compensating purposes. This structure is of a conventional type of brake and the invention comprises a bow-shaped resilient arm 15 which is rockably mounted at 16 to the stationary cover 17. A head 18 is carried by one end of the arm 15 and mounted on this head and projecting downwardly therefrom is a spring arm 19 which is provided with a slot 20 adjacent its lower end and normally held by the leaf spring 21 in engagement with the periphery of the rachet wheel 22 which is fixedly mounted on the rod 23 which projects into the sockets 24 formed in the ends of the shoes 9 and 10 and is threaded into the nuts 25 which are positioned in the sockets 24. The opposite end of the arm 15 is curved outwardly as at 26 and normally engages the plate 11.

In operation, when the brake is applied the arm 15 will be slightly rocked as the movement of the shoes 9 and 10 will be through but a slight distance. As the lining 12 of the shoes wears, the plate 11 will be rocked farther toward center and farther toward the end 26 of the arm 15 so that the arm 15 will thereby be rocked sufficiently to bring the slot 22 downwardly over a tooth of the ratchet wheel 23 and engage the same.

Upon release of the brakes, the spring 27 will rock the arm 15 on its pivot 16 and the rod 23 will be rotated slightly to effect a spreading apart of the shoes 9 and 10, the opposite ends of the rod 23 being oppositely threaded. In this way, I have provided a mechanism which under normal operating conditions of the brake is not operative and which, when the brake shoes become worn so that a normal condition is not present, will automatically adjust the shoes to compensate for the wear of the brake shoe lining and restore the brake in its operations to normal condition.

While I have illustrated and described the preferred form of construction of my invention, I do not wish to limit myself to the precise details of structure shown, but desire to avail myself of such variations and modifications as may come within the scope of the appended claim.

Having thus described my invention, what I claim is new and desire to secure by Letters Patent is:

A device of the class described, comprising: a brake drum; a pair of brake shoes movably mounted in said brake drum; a brake lining on the periphery of each of said brake shoes engageable with said brake drum upon the movement of said shoes outwardly from each other; means for moving said shoes outwardly from each other, each of said shoes having at one end a socket, the sockets in the oppositely positioned shoes being in alignment; a threaded nut rockably mounted in each of said sockets; a rod threaded at its opposite ends and threaded through each of said nuts; a ratchet wheel fixedly mounted on said rod intermediate its ends and positioned between the adjacent ends of said shoes; a bow shaped resilient arm rockably mounted in said drum; a spring arm carried by said bow shaped arm and projecting over and normally in engagement with the periphery of said ratchet wheel, said spring arm having a slot formed therein, said bow shaped arm being rocked upon movement of said shoes outwardly beyond a predetermined distance for effecting engagement of one of the teeth of said ratchet wheel in said slot; and resilient means for returning said bow shaped arm to normal position subsequent to outward movement of said shoes as aforesaid for effecting a rotation of said rod and maintaining the adjustment of said shoes relatively to said brake drum.

In testimony whereof I have signed the foregoing specification.

ALEXANDER KHEZARJIAN.